Sept. 10, 1929.　　　　L. ROUANET　　　　1,727,445
MOUNTING OF SHOCK ABSORBERS
Original Filed June 4, 1925
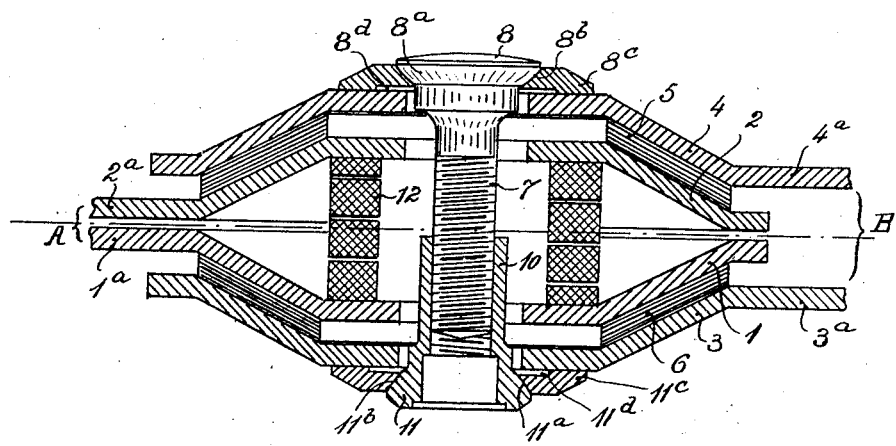

Patented Sept. 10, 1929.

1,727,445

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE.

MOUNTING OF SHOCK ABSORBERS.

Original application filed June 4, 1925, Serial No. 34,944, and in France July 17, 1924. Divided and this application filed August 27, 1926. Serial No. 132,018.

The present invention relates to shock absorbers of the type comprising a set or group of external shells and a set of interior shells held together by means of an assembling bolt whilst influenced by a central or internally disposed spring, friction elements being interposed between the groups of internal and external shells.

The invention which is a division of applicant's copending application Serial No. 34,944. filed June 4, 1925, has for object to provide, in shock absorbers of such type, a special method of mounting the central assembling bolt, according to which a certain play is left between the shells and the bolt, at the points where the latter pass through the former, so as to permit the independent operation of each arm of the shock absorber as regard the bending and torsional movements, the bearings of the assembling bolt on the external shells being obtained through the intermediary of comparatively large washers so as to remove said bearings at a comparatively great distance from the center.

Further, the heads of the assembling bolt and the washers are so formed as to provide for corresponding seats of such a shape that relative movements are permitted between the groups of shells without resulting in either abnormal separation of the interior shells or in a disengagement of the bearing surfaces.

Other features of the invention will appear more clearly from the following detailed description, with reference to the accompanying drawing showing an axial sectional view of a shock absorber of the simple type in which the assembling bolt is arranged according to the invention.

The shock absorber of the figure comprises four shells 1, 2, 3, 4, made on the same standard, and arranged in two sets or groups. The interior group includes the shells 1 and 2 the extensions $1^a$ and $2^a$ of which form together one of the arms A of the device; the external group includes the shells 3 and 4 the extensions $3^a$ and $4^a$ of which form the other arm B.

Friction elements, of suitable material, designated by references 5 and 6, are respectively interposed between the shells 2 and 4, and between the shells 1 and 3.

The assembly is obtained by means of a central pin or bolt 7 provided with a nut 10, and the pressure is produced by the action of the spring 12 located inside the internal group of shells. Preferably the spring 12 is coiled up around the assembling bolt as represented.

In each shell of each group, the diameter of the opening provided for the passage of the central bolt is larger than the corresponding diameter of the bolt, as shown, the bearings of the bolt on the exterior shells being obtained by interposing washers $8^c$ and $11^c$.

The head 8 of the connecting bolt 7, and the head 11 of the nut 10 are formed with bearing surfaces $8^a$ and $11^a$, preferably of spherical shape, which rest on corresponding seats $8^b$ and $11^b$ on the washers $8^c$ and $11^c$.

These washers are of comparatively large diameter and further cup shaped as at $8^d$ and $11^d$ so that the bearing on the shells will be brought at a relatively large distance from the axis of the device, in order to permit considerable distortion of the whole without causing abnormal stresses on the assembling bolt 7.

It results that relative movements of the sets or groups of shells situated on either side of the assembling bolt are thus rendered possible without important variation in the space existing between the interior shells and without causing the separation of the various bearing surfaces.

The sets or groups of shells remain thus elastically centered with respect to each other by reason of their arrangement and by the action of the spring 12.

This method of assembling enables the arms of the shock absorber to bend easily, each arm operating independently as regard the bending and torsional actions, the distortions being facilitated by the rotating movements which take place without inconvenience on account of the play provided between the assembling bolt 7 and all the shells.

It is to be understood that the invention is not limited to the spherical shape of the bearing surfaces 8ª and 11ª, nor to a particular number of shells or groups of shells forming the shock absorber.

The bearing surfaces may for example be made conical or even flat provided that their diameter be relatively small whilst the bearing of the shells is located at a relatively large distance from the axis of the device.

Claims:

1. A shock absorber comprising a set of exterior shells, a set of interior shells, friction elements interposed between the adjacent shells, an assembling bolt extending through apertures in the shells and a spring coiled around the bolt and inserted between the interior shells, characterized in that the apertures are of widely larger diameters than the opposite parts of the bolt, whereby a substantial amount of play is left between said bolt and the apertures of all the shells to allow each arm of the shock absorber to operate independently as regard the bending and torsional actions.

2. In a shock absorber according to claim 1, cup shaped washers interposed between the head and nut of the connecting bolt and the exterior shells of the device, such washers having substantially small apertures and substantially widely located bases to locate the bearing on the shells at a substantially large distance from the axis of the bolt and thus permit relative movements between the sets of shells without causing either abnormal separation between the interior shells, or disengagement of the contacting surfaces.

3. A shock absorber comprising a set of exterior shells, a set of interior shells, friction elements interposed between the adjacent shells, an assembling bolt extending through apertures in the shells and a spring coiled around the bolt and inserted between the interior shells, characterized in that a certain play is left between the bolt and the apertures of all the shells to allow each arm of the shock absorber to operate independently as regard the bending and torsional actions, cup shaped washers interposed between the head and nut of the bolt and the exterior shells of the device, said washers having small apertures for the bolt and widely located bases, the head and nut of the bolt having spherical or equivalent bearing surfaces resting on corresponding seats of the interposed washers, to allow for large distortions of the device.

In testimony whereof I affix my signature.

LOUIS ROUANET.